United States Patent [19]

Waranowitz

[11] Patent Number: 4,613,103
[45] Date of Patent: Sep. 23, 1986

[54] CROSSING BELL AND FLASHER

[75] Inventor: Benjamin Waranowitz, Chesapeake Beach, Md.

[73] Assignee: David B. Lellinger, Vienna, Va.

[21] Appl. No.: 425,254

[22] Filed: Sep. 28, 1982

[51] Int. Cl.$^4$ .................. B61L 13/04; B61L 29/28
[52] U.S. Cl. ................. 246/473 A; 246/126; 246/294; 340/326; 340/942
[58] Field of Search .............. 246/1 C, 293–296, 246/473 A, 125–127; 46/226, 227, 232; 340/47, 49, 50, 326, 327, 331, 815.21, 815.22, 384 E, 942; 331/66; 116/2, 3, 202

[56] References Cited

U.S. PATENT DOCUMENTS

| 3,381,219 | 4/1968 | Dumbeck | 340/942 X |
| 3,425,156 | 2/1969 | Field | 46/232 |
| 3,631,392 | 12/1971 | Zelina | 340/331 X |
| 3,765,006 | 10/1973 | Takahashi et al. | 340/331 X |
| 4,293,851 | 10/1981 | Beyl, Jr. | 340/384 E |
| 4,294,035 | 10/1981 | Klein | 46/227 |
| 4,369,943 | 1/1983 | Hussein | 246/473 A X |

OTHER PUBLICATIONS

"Practical Electronic Projects for Model Railroaders", Thorne, P. Kalmbach, Milwaukee, Wisconsin, 1974, pp. 44,45,56 and 57.

"Crossing Bell and Flasher", *Bulletin of National Model Railroad Assoc.*, Waldon, G., 1977, vol. 43, No. 4, pp. 18–20.

"Detection Circuit", *Model Railroader*, Paul, Aug. 1973, vol. 40, No. 8, pp. 65–67.

"Train Detection Circuit for TTL Systems", *Model Railroader*, 1977, vol. 44, No. 1, pp. 98–100.

Automatic Diamond Crossing Control, Practical Electronics, vol. 18, No. 7 (Jul. 1982).

*Primary Examiner*—Randolph Reese
*Assistant Examiner*—Edward M. Wacyra
*Attorney, Agent, or Firm*—Roger A. Johnston

[57] ABSTRACT

A model railroad crossing bell and flasher employs spaced photocell detectors along the model railroad track. A comparator receives the photocell detector output signals and upon detecting a train shadow provides power to a first oscillator which actuates a pair of light emitting diodes in alternate sequence. Simultaneously, the first oscillator provides power to a second oscillator of a different frequency than the first oscillator. The second oscillator attenuates the first oscillator output signal to create a ringing sound through a loud speaker.

4 Claims, 2 Drawing Figures

CROSSING BELL AND FLASHER

BACKGROUND OF THE INVENTION

The present invention relates to toy trains or model railroads, particularly model railroads where the track layout and scenery are to precise numerical scale of the railroad equipment with a high degree of authenticity and realism. In creating such scale model railroad layouts it is desirable to reproduce the warning and safety devices employed in full scale railroading.

In particular, it is desirable to provide a model railroad layout with authentic operating signals, flashers, gates and crossing bells.

In order to provide scale grade crossing alarms and flashers for model railroad layouts, it is necessary to provide a technique or means for detecting the passage of the model train when it passes through the track section allotted for grade crossing. Heretofore, devices employed for detecting passage of the model train have included means by which a circuit was completed between the rails through the metal structure of the wheels and chassis of the model rolling stock.

Another technique which has been employed for detecting model train passage has been the use of a photo detector disposed between the model track rails and calibrated to sense the shadow of the passing train. Where it is desired to maintain operation of an alarm device while the train is in a particular block of track, it is known to employ two photocell detectors spaced along the track to show model train shadow. However, where photocell detectors have been employed, it has been found necessary to employ electromechanical relays to activate alarm devices in view of the extremely low current handling capability of the solid state photocell detectors employed.

Furthermore, it has been desired to provide in a model railroad layout, simultaneous actuation of grade crossing flashers and authentic reproduction of a full scale grade crossing alarm bell sound.

Previous techniques for providing both grade crossing flasher and alarm bells for model railroads have employed separate detector circuits and relay mechanisms for activating the flasher lights and the alarm bell devices individually.

Thus, it has been desirable to find a way or means for detecting passage of a model railroad train through a block or section of track, such as a grade crossing, and to provide for low voltage solid stage circuitry devices for controlling and activating simultaneously, a grade crossing flasher and grade crossing alarm bell without the need for relays.

SUMMARY OF THE INVENTION

The present invention provides a solution to the above described problem of enabling low voltage solid state circuitry devices to be employed for sensing the shadow of passage of a model train and to control and activate simultaneously a grade crossing flasher light and audible warning bell in a manner authentically simulating full scale railroad grade crossings.

The present invention employs a pair of photocell detectors spaced along the track layout a predetermined distance as, for example, on the approach and departure side of a grade crossing for detecting shadow of model train passage over either detector. The present invention employs a voltage divider for providing an output voltage from the detectors proportional to the variations in the resistance of the detectors caused by passage shadows.

A comparator compares the voltage from the voltage divider with a reference voltage for emitting an output signal when the voltage from the voltage divider is greater than the reference voltage. The output of the comparator enables an inverter which is fired by a low output from the oscillator. The oscillator output is employed to flash intermittently a pair of light emitting diodes (LED's) and the low output of the oscillator fires the comparator for alternately firing a second pair of LED's to thus produce alternate flashing pairs of LED's to simulate the flashing of an authentic full scale grade crossing flasher.

The inverter output and the oscillator output are applied through OR logic to enable switching means to turn on a second oscillator, which upon power-up draws the switching means to ground to in turn switch off the oscillator. Resonant circuit means are employed to attenuate the oscillator output, which is applied through an amplifier to an acoustic transducer or speaker, to provide an audible intermittent ringing bell sound.

The present invention employs a single, solid state circuit comprising the comparator, converter, oscillator, switching and amplifying means; and, thus, provides a convenient, compact and low cost, solid state circuit device. The present invention thus provides a novel and inexpensive device for detecting model train passage and providing simultaneously the effect of grade crossing flasher lights and warning bell.

DETAILED DESCRIPTION

Figure 1:
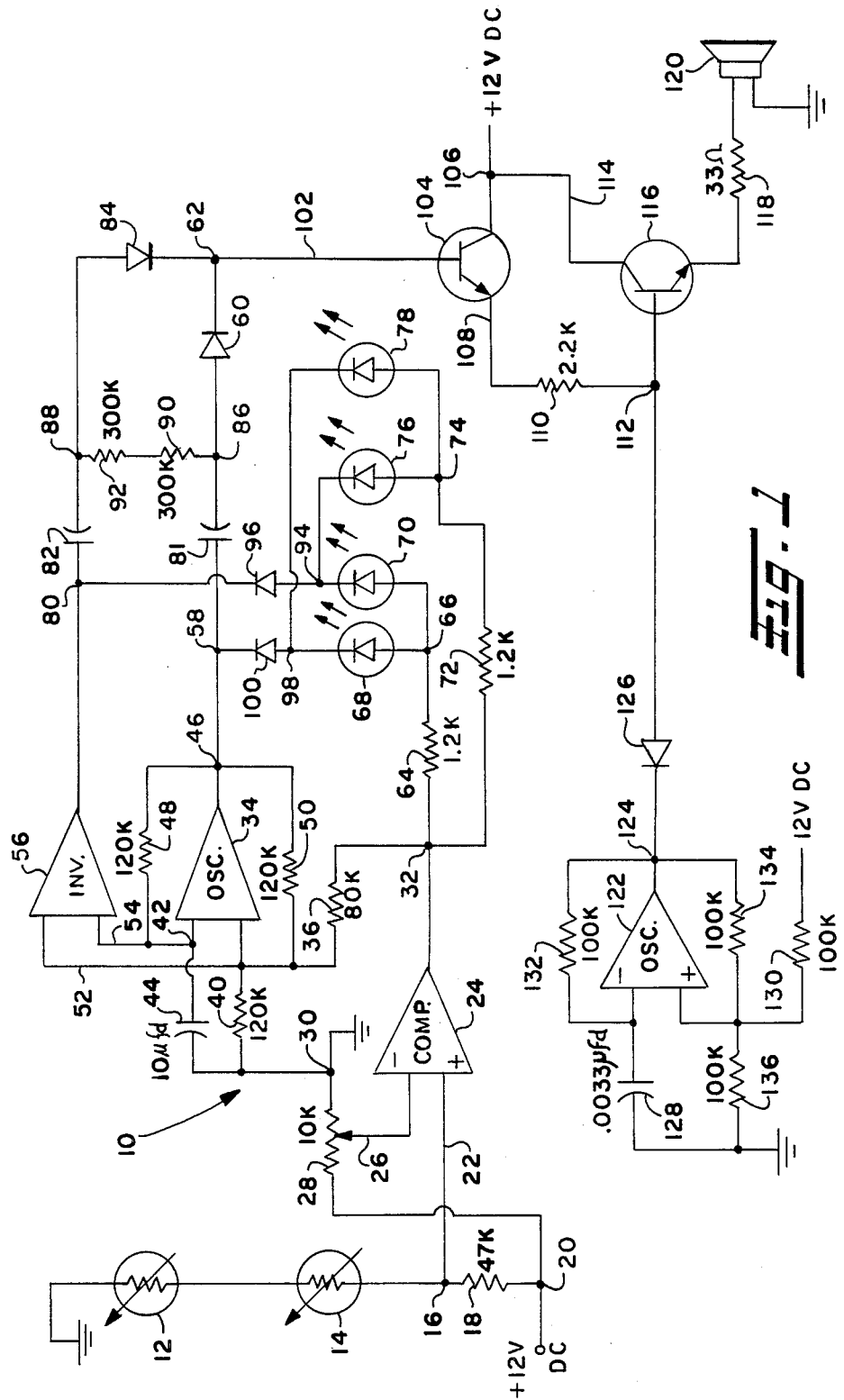
FIG. 1 is a schematic of the operating circuitry for the preferred system of the present invention.

Referring now to FIG. 1, the system of the present invention is indicated generally at 10 as having a pair of photocell detectors 12,14 disposed electrically in series and in spaced relationship along the track of a model railroad layout. In the presently preferred practice, the photocell detectors 12,14 may be placed between the rails of the model track layout and disposed a predetermined distance apart to protect a given track section as, for example, a grade crossing whereupon one detector would be disposed from the approach side of the grade crossing and the other detector on the departure side. When either of the detectors 12,14 detects the shadow of the passing train thereover, the resistance of the detector is changed. Junction 16 is in series with a resistance 18 and 12 volt D.C. power source at junction 20.

The output of the voltage divider at junction 16 is applied to a long lead 22 to one input of a comparator 24. The remaining input of comparator 24 is connected via lead 26 to the variable resistance terminal of resistor 28 which is connected between junction 20 and ground potential via junction 30. The output of comparator 24 is connected to a junction 32.

An oscillator 34 having a relatively low frequency, or rate of oscillation, has one input thereof connected via junction 38 and resistor 36 to the comparator output junction 32. Junction 38 is connected to ground through resistor 40. The second input of oscillator 34 is connected to ground via junction 42 and capacitor 44. The output of the oscillator is connected to junction 46 which is also connected via feedback resistors 48,50 respectively, to oscillator input junctions 42,38.

The input junctions 38,42 of the oscillator 34 are also connected via leads 52, 54, respectively, to the inputs of an inverter 56.

The output of oscillator 34, through junction 46, is applied through junction 58 through diodes 60 to junction 62.

The output of comparator 24 to junction 32 is applied through resistor 64 at junction 66 to a pair of light emitting diodes (LED) 68,70. Similarly, the comparator output voltage at junction 32 is applied to resistor 72, junction 74 to a pair of LED 76,78.

The output of inverter 56 is applied through junction 80, capacitor 82 to a diode 84 which is also connected to junction 62. The positive lead of diodes 84 and 60 are respectively grounded via junctions 86,88 through respective individual resistors 90,92.

Light emitting diodes 70, 76 are connected via junction 94 through diode 96 to junction 80.

Similarly, LED's 68, 78 are connected via junction 98 and blocking diode 10 to the oscillator output junction 58. The output of diodes 60, 84 is connected through junction 62 and lead 102 to the base of a transistor switch 104. The collector of transistor switch 104 is connected through junction 106 to a source of 12 volt electrical power. The emitter of transistor switch 104 is connected via lead 108 through resistance 110 to a junction 112.

A second transistor switch 116 has the collector thereof connected via lead 114 to supply junction 106 and has the emitter thereof connected through resistance 118 to one terminal of an acoustical transducer or speaker 120. The remaining terminal of the speaker 120 is connected to ground. A second oscillator 122 is provided and has the output connected via junction 124 through reversed biased diode 126 to junction 112.

The oscillator 122 has the negative input thereof connected to ground through capacitor 128. The positive input of oscillator 122 is connected through resistance 130 to a source of 12 volt power. Feedback resistances 132, 134 are connected respectively from oscillator output junction 124 to the negative and positive inputs of the oscillator. A resistance 136 connects the positive oscillator input to ground.

In operation, the photocells 12,14 change in resistance as either is shadowed by passage of a model train. The change in resistance of the photocells thus varies the voltage at junction 16 and the voltage to the positive input of comparator 24. When the comparator voltage input from the photocells is greater than the level of the reference voltage from variable resistance 28, the comparator output to junction 32 goes high. The high output from comparator 24 enables inverter 56 and simultaneously turns on the oscillator 34.

The oscillator 34 is a relatively slow rate oscillator which provides the flashing rate and power for the LED's 68, 78. The high comparator output at junction 32 turns on inverter 56 which provides power through junction 80 to diodes 70, 76.

A low output from comparator 24 inhibits oscillator 34 and inverter 56 and, thus, prevents flashing of the LED's 68,70,76,78. When the comparator output at junction 32 goes high, the oscillator and inverter function to alternately flash the pairs of diodes 68,78 and 70,76.

The high and low alternating outputs from the inverter 56 and oscillator 34 are transmitted via coupling capacitor 81,82 to respective diodes 60 and 84 which function in OR logic through junction 62 to cause switching transistor 104 to turn on with each alternate lamp flash.

The transistor switch 104 turns off in an attenuated manner because of the resonant networks 92,82 and 81,90 which have a relatively high time constant.

When switching transistor 104 turns on, it tends to turn on switching transistor amplifier 116 continuously. However, the oscillator 122 which is powered-up by transistor switch 104 and is a relatively fast oscillator draws the output of transistor 104 to ground. This interrupts the power up of oscillator 122 at a fast rate as determined by resistances 132,134 and 136 to thus produce a ringing sound through loudspeaker 120.

The present invention, thus, employs a single integrated circuit comprising inverter 56, oscillator 34 and oscillator 122 to end comparator 24 to simultaneously power up and flash two pairs of LED flashers and produces an audible ringing through a loudspeaker to thereby simulate the grade crossing alarms of full scale railroad operation.

The present invention employs photocell detectors disposed in spaced relationship along the model railroad track layout to sense train passage by detection of the shadow formed thereon and the output of the photocell detectors is employed to directly enable the driving circuitry for the flasher lights and alarm bell without employing any intermediate electromechanical relays.

The present invention thus provides a simplified novel detection flashing and bell ringing system for a model railroad.

Figure 2:
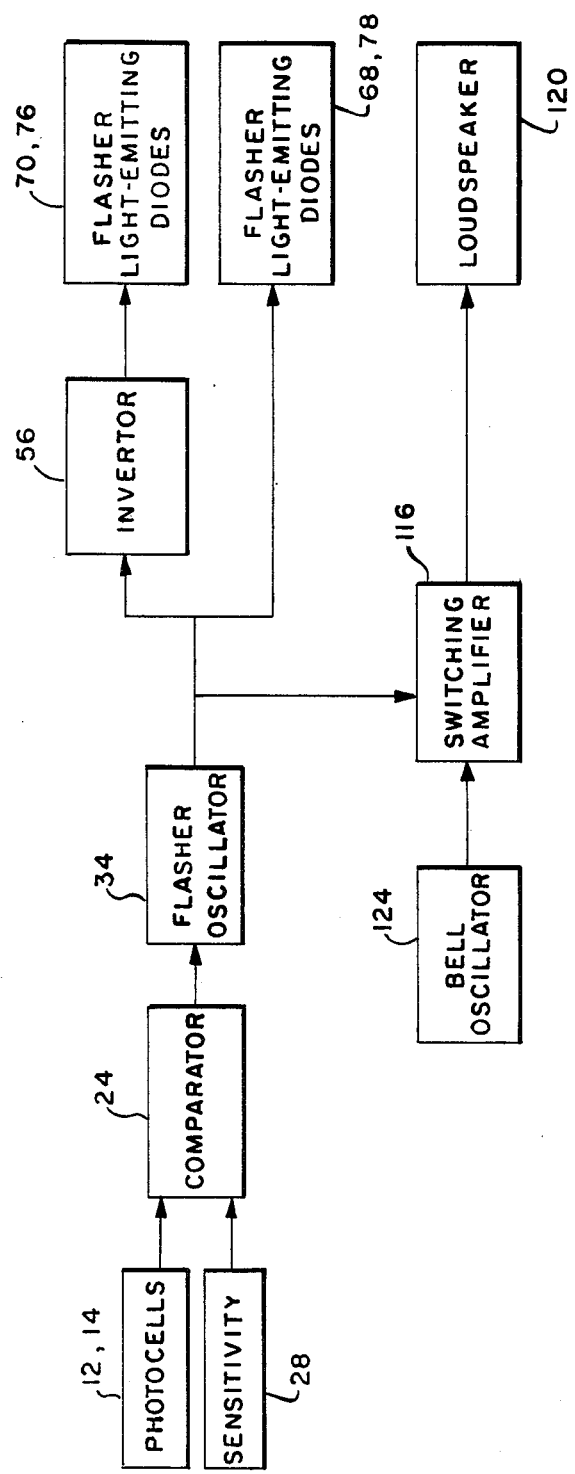
FIG. 2 is a logic block diagram of the system of FIG. 1.

Referring to FIG. 2, a simplified logic block diagram of the circuit of FIG. 1 is shown.

Although the present invention has hereinabove been described with respect to the presently preferred practice, it will be understood by those having ordinary skill in the art that modifications and variations in the invention may be made and the invention is limited only by the following claims.

I claim:

1. A train detection and indicating system for a model railroad comprising:
   (a) first and second series connected light detecting means adapted for placement in predetermined spaced relationship along the direction of motion of a model train for detecting normal light and a shadow upon passage of a model train;
   (b) a power supply and means operative upon connection to said source of power to provide a voltage to said first and second light detecting means;
   (c) said light detecting means each being operative to change resistance upon detecting the shadow cast thereon upon passage of the model train;
   (d) comparator means having a first input connected to said detecting means and a second input connected to a source of reference voltage; said comparator means being operative to change signal state at the output thereof in response to one of said light detecting means sensing model train shadow, and providing a voltage above said reference voltage;
   (e) an oscillator operative upon connection to said comparator means output to emit an output signal at a predetermined desired frequency;

(f) flasher means operative in response to said oscillator output to provide an alternating visible signal.

2. The system defined in claim 1 further comprising:
   (a) a second oscillator having an output different from said first oscillator;
   (b) switch means responsive to said flasher means and operative to turn on said second oscillator;
   (c) means responsive to the output of said second oscillator to deactuate said switch means thereby switching off said second oscillator;
   (d) resistance means connected to said second oscillator means and operative to interrupt the on time of said second oscillator at a predetermined rate upon actuation of said switch means; and,
   (e) transducer means receiving the output of said second oscillator, said transducer means operative to emit an audible signal.

3. The system defined in claim 1 further comprising inverter means receiving the output of said comparator means and operative to activate said flasher means.

4. A train detection and indicating system for a model railroad comprising:
   (a) first and second series connected light detecting means disposed in predetermined spaced relationship along the direction of motion of a model train for detecting normal light and shadow of passage of a model train;
   (b) a power supply and means operative upon connection to said source of power to provide a voltage to said first and second light detecting means;
   (c) said light detecting means each being operative to change resistance upon detecting the shadow cast thereon by passage of a model train;
   (d) comparator means having a first input connected to receive the voltage from said detecting means and a second input connected to a source of reference voltage, said comparator means being operative to change signal state of the output thereof in response to one of said light detecting means sensing model train shadow, and providing a voltage above said reference voltage;
   (e) a first oscillator operative upon connection to the comparator means output to emit an output signal at a predetermined frequency;
   (f) a second oscillator responsive to the output of the first oscillator having a frequency higher than the first oscillator;
   (g) resonance circuit means operative to attenuate said first oscillator output by said second oscillator; and,
   (h) transducer means operative upon receipt of said attenuated first oscillator output to produce a bell sound.

* * * * *